Jan. 19, 1943.  H. D. BREEN  2,308,741
BRAKE OPERATING MECHANISM
Filed April 23, 1941  2 Sheets-Sheet 1

INVENTOR
HENRY D. BREEN
BY Davison, Ooms & Booth
ATTORNEYS

Jan. 19, 1943. H. D. BREEN 2,308,741
BRAKE OPERATING MECHANISM
Filed April 23, 1941 2 Sheets-Sheet 2

INVENTOR
HENRY D. BREEN
BY
ATTORNEYS

Patented Jan. 19, 1943

2,308,741

UNITED STATES PATENT OFFICE 2,308,741

BRAKE OPERATING MECHANISM

Henry D. Breen, Chicago, Ill.

Application April 23, 1941, Serial No. 389,859

4 Claims. (Cl. 74—505)

This invention relates to brake operating mechanism, such as that employed on railway cars, and more particularly to a novel brake mechanism housing and supporting structure.

One of the objects of the invention is to provide a housing and supporting structure for a brake operating mechanism which can be readily manufactured from two complementary steel stampings. A further object of the invention is to provide a housing and supporting structure of that charatcer in which the flanges by which the complementary housing members are secured together and the reinforced ears by which the housing is secured to the wall of a railway car are pressed from the same sheet of material as that from which the housing members are pressed.

A further object of the invention is to provide brake operating mechanism in which easy and convenient access may be had to the operating parts for inspection, repair or replacement without demounting the entire mechanism. This is accomplished by providing a housing for the mechanism formed of two pivotally interconnected parts which can be opened up to expose the mechanism, which is one important feature of the invention.

Another object of the invention is to provide brake operating mechanism including a housing and supporting structure formed by two parts having interfitting connected flanges so that the parts serve to reinforce and strengthen each other.

Still another object of the invention is to provide brake operating mechanism including winding means rotatably supported on an axle in which the axle can be removed for removal of the winding means without disturbing the remainder of the mechanism.

The above and other objects, advantages and desirable features of the invention will be apparent from the following description of the embodiment shown in the accompanying drawings in which.

Figure 1:
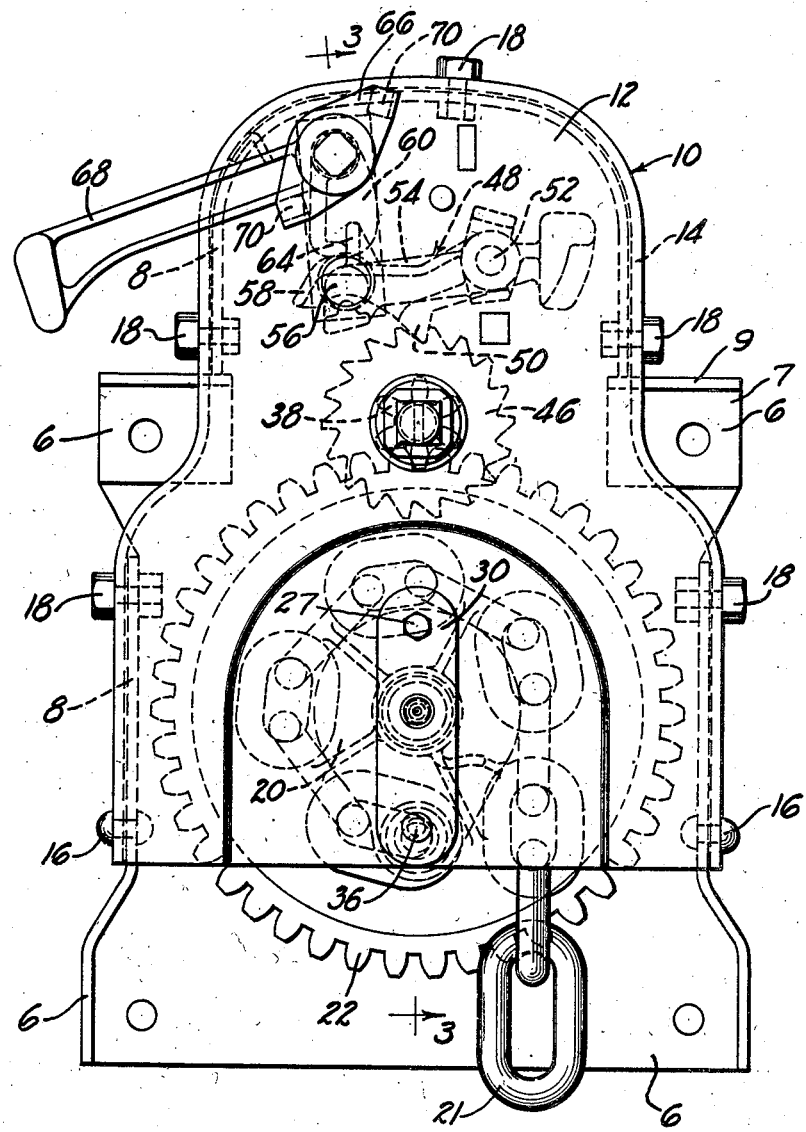
Figure 1 is a front elevation with the hand wheel omitted of a brake operating mechanism embodying the invention.

The illustrated mechanism is intended particularly for manual operation of the brakes on railway or like cars and includes a back plate 4, preferably stamped or pressed from a metal sheet and formed with perforated ears 6 by means of which it may be permanently bolted or screwed to the end or side wall of a car. Upstanding flanges 8 are integrally formed on the plate 4 and extend around the upper and side portions of its periphery except for the portions from which the ears 6 extend and along the lower edge of the plate. These flanges serve as a means of securing the front cover 10 to the plate 4 and also to strengthen the housing.

The ears 6 by which the plate 4 is secured to the wall of a railway car are composed in part of a flat portion of the plate 4 projecting beyond the flanged body of the plate. They are preferably reinforced by the reinforcing plates 7 welded to the ears 6. Added strength may be provided by forming each of the reinforcing plates from a short strip of angle iron, with the flange 9 rising vertically therefrom.

The ears 6 are located beyond the body of the plate 4 and the flanges 8 so that the entire brake operating mechanism and the housing are supported between the ears. This not only assures a broad base of support, but also enables the bolts used to secure the housing to the wall of a railway car to be removed and the brake operating mechanism dismounted without disassembling the structure.

The housing and supporting structure comprise the back plate 4 and a front cover plate 10. This plate, like the back plate, is preferably pressed or stamped from sheet material.

The cover plate 10 includes the front plate portion 12 lying generally parallel to the back plate and a downwardly turned flange 14 extending across the top and down both sides of the cover. The flange 14 is shaped to fit over the flanges 8 and to be secured thereto. The cover plate is pivotally connected to the back plate at the lower end of the cover by permanent fastenings such as the rivets 16. At one or more points spaced around the periphery of the cover the flanges 8 and 14 are connected by removable fastenings such as bolts 18. These are preferably turned into nuts or threaded bosses permanently secured to the inside of the flanges 8. By this means the flanges serve to reinforce each other and to form a very strong and rigid supporting housing.

Figure 3:
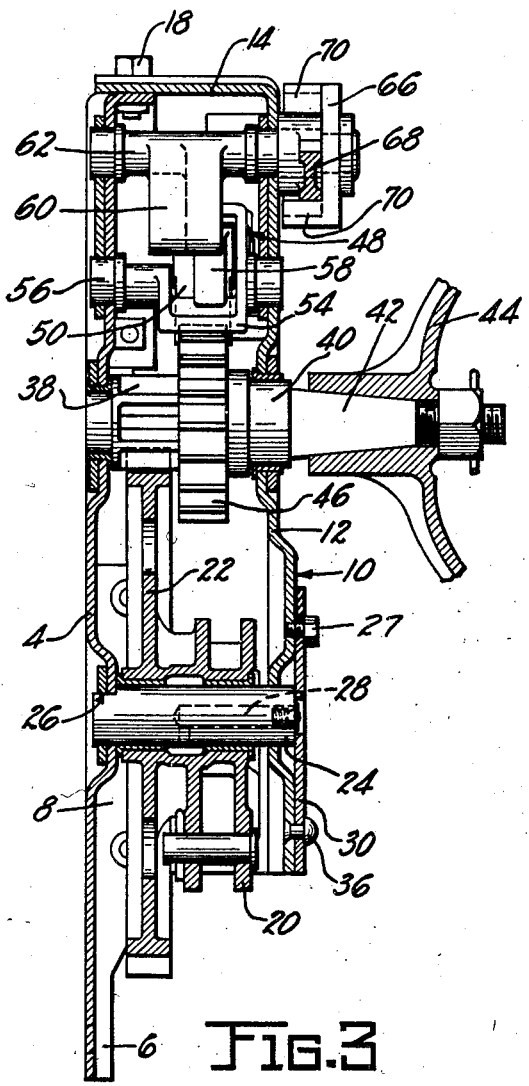
Figure 3 is a section on the line 3—3 of Figure 1 with parts in elevation.
Figure 2:
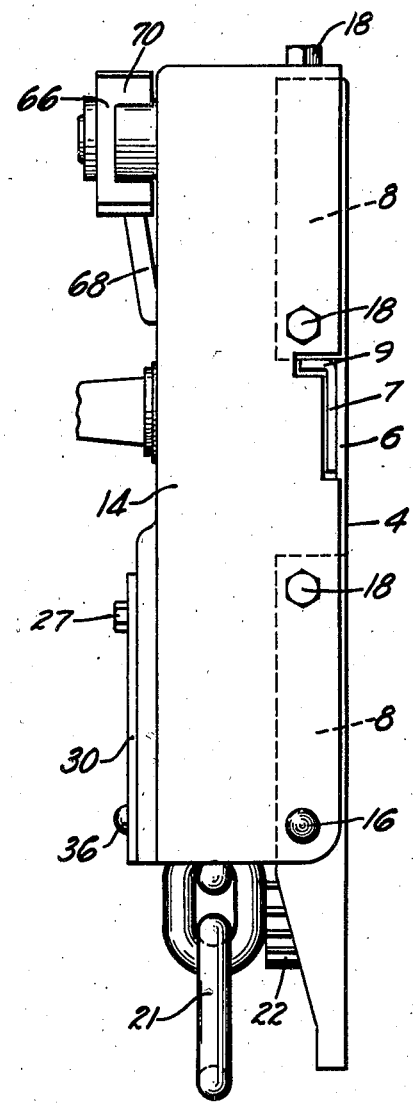
Figure 2 is a side elevation.

The winding mechanism supported within the housing is shown as including a sheave 20 receiving a tension chain 21 and integrally formed with a gear 22, supported for rotation on an axle 24. The axle is supported in aligned openings in the back plate 4 and the face of the front cover plate 10, the rear end of the axle being flattened on one side at 26 and fitting within a similarly shaped opening in the back plate to prevent the axle from turning and to limit its movement through the back plate. As shown in Figure 3, the axle may be formed with an oil hole 28 opening at its forward end for lubrication of the bearings supporting the sheave 20 and gear 22.

In order to hold the axle 24 in place, the hole in the front cover plate 10 in which the axle 24 rests is covered by a retainer plate 30. This plate is pivotally supported at its lower end by a single fastening 36, which may be a bolt or rivet. The plate 30 extends across the outer end of the axle 24 to hold the axle in place, and is formed with a hole registering with the oil hole 28 through which lubricant may be supplied. The plate is fastened at its upper end so that it can be removed to permit removal of the plate 30, the axle 24 and the sheave and pinion. For this purpose the fastening may be a bolt 27, as shown, or a screw or a rivet, which can be cut or punched out for removal of the winding mechanism when desired, but which will resist tampering by unauthorized persons.

The winding sheave is turned by a pinion 38 meshing with the gear 22 and carried by or formed on a shaft 40 journaled in aligned openings in the front and back plates. An extension of the shaft 40 projecting beyond the front plate at 42 supports a handwheel 44 by which the sheave 20 may be turned to tighten the chain 21.

Unwinding of the sheave is prevented by ratchet mechanism including a ratchet wheel 46 on the shaft 40 engaged by pawl means indicated generally at 48. The pawl means as shown is of the type more particularly described and claimed in the co-pending application of Henry D. Breen, Serial No. 327,184, filed April 1, 1940, and includes a counterweighted pawl 50 engageable with the ratchet wheel 46 and pivoted intermediate its ends at 52 on a pivoted carriage 54. The carriage 54 is pivotally supported by a shaft 56 journaled in aligned openings in the front and back plates.

The pawl is so balanced that it normally tends to swing clockwise to a position in which the pawl tooth is out of engagement with the ratchet wheel. To move the pawl into position to engage the ratchet, it is formed with an extending control finger 58 lying in the path of a control cam 60 which is supported on a shaft 62 journaled in the front and back plates. When the cam is in the position shown in Figure 1 it presses the finger 58 down to rock the pawl 50 counterclockwise, into a position to engage the ratchet, a stop 64 on the carriage 54 limiting movement of the cam.

The cam 60 is operated by means of a head plate 66 secured to an extension of the shaft 62 in front of the front cover plate 10. A control lever 68 is loosely mounted on the shaft extension and is adapted to engage one or the other of two stops 70 carried by the plate 66. As shown in the drawings, the control lever 68 has been thrown to its counterclockwise position to engage the stop 70 at the left of the plate 66 and rock the cam 60 into a position to cause the pawl to engage the ratchet.

To release the ratchet the lever 68 is thrown counterclockwise until it engages the right hand stop 70 and may then be turned further to rock the cam clockwise out of engagement with the control finger 58. If the chain 21 is under tension it will cause a pressure to be exerted by the ratchet 46 on the pawl 50 and force the pawl out of engagement with the ratchet. The winding mechanism may be further turned under control of the hand wheel in a direction to loosen the chain 21.

When the brake mechanism requires inspection or the repair or replacement of any of the parts the mechanism can readily be dismounted. By removal of the bolt 27 on the retainer plate 30 it can be swung about the pivot 36 from its position over the axle 24, and the axle can then be pulled out of the housing. Thereupon the sheave and gear may be dropped through the open bottom of the housing.

When any of the upper parts of the mechanism require inspection or replacement the hand wheel 44 is removed. Then bolts 18 securing the complementary flanges 8 on the back plate 4 and the flange 14 on the cover 10 are removed and the cover 10 is swung forwardly and downwardly about the pivots formed by the rivets 16, exposing the entire working mechanism for inspection. The control lever 68 and head plate 66 can be removed or left in position during this operation.

With the cover plate in this inclined condition any of the operating parts can readily be lifted from within the housing and inspected for wear and breakage. Any defective parts can readily be replaced and the cover 10 readily restored by being swung upwardly about the pivots 16 into closed position. Thereupon the bolts 18 and the axle 24 and sheave 20 can be replaced and the mechanism is restored for operation.

If removal of the entire brake operating mechanism is required, this can readily be done by removal of the bolts (not shown) from the perforated ears 6, by which the housing is secured to the wall of a railway car, and dismounting the assembled structure. This can be done without disassembling the mechanism supported within the housing.

While one embodiment of the invention has been shown and described in detail, it will be understood that this is illustrative only and is not intended as a definition of the scope of the invention, reference being had for this purpose to the appended claims.

Having described my invention, what I claim as new and desire to secure by Letters Patent is:

1. Brake operating mechanism comprising a back plate, a cover having a front portion overlying the back plate and side and top portions, winding mechanism supported between the back plate and the cover, means forming a pivotal connection between the back plate and the cover adjacent one end of the cover, and removable fastening means securing the cover to the back plate at points spaced from said pivotal means whereby the cover can be swung to a position to expose the winding mechanism.

2. Brake operating mechanism comprising a back plate, a cover having a front portion overlying the back plate and side and top portions, winding mechanism supported between the back plate and the cover, means pivotally connecting said side portions adjacent their lower edges to the back plate, and removable fastenings securing the side and top portions of the cover to the back plate.

3. Brake operating mechanism comprising a back plate formed throughout a part of its periphery with upstanding flanges, a cover plate including a front portion and side and end flanges formed to interfit with the flanges on the back plate, winding mechanism supported between the back plate and the cover plate, means pivotally connecting the flanges on the back and cover plates on an axis adjacent one edge of the cover plate, and removable fastenings directly connecting the flanges on the back and cover plates at a plurality of spaced points to form a rigid housing assembly.

4. Brake operating mechanism comprising a back plate adapted to be permanently secured to the side of a car, a cover plate pivotally connected adjacent one edge to the back plate, removable fastenings securing the cover plate to the back plate at a plurality of spaced points, said back and cover plates being formed with a plurality of pairs of aligned openings, an axle insertable and removable through one of the openings in the cover plate to be supported in said opening with the aligned opening in the back plate, winding mechanism rotatably supported on said axle, retainer means on the cover plate normally to hold the axle in assembled position, a drive shaft rotatably supported in another pair of aligned openings and projecting beyond the cover plate to carry a hand wheel means on the drive shaft drivably engaging the winding mechanism, a ratchet shaft supported in a third pair of aligned openings, ratchet means on said ratchet shaft for normally holding the drive shaft against rotation in one direction, and a control shaft rotatably mounted in a fourth pair of aligned openings and carrying means for controlling the operation of the ratchet means, said drive shaft, ratchet shaft and control shaft being removable by removing said removable fastenings and swinging the cover plate to an open position about its pivotal mounting.

HENRY D. BREEN.